(12) United States Patent
Stoll et al.

(10) Patent No.: US 6,593,485 B1
(45) Date of Patent: Jul. 15, 2003

(54) STABILIZER COMPOSITION

(75) Inventors: Klaus Stoll, Binzen (DE); Andreas Thuermer, Huningue (FR); Rainer Wolf, Allschwil (CH)

(73) Assignee: Clariant Finance (BVI) Limited, Tortola (VG)

( * ) Notice: Subject to any disclaimer, the term of this patent is extended or adjusted under 35 U.S.C. 154(b) by 1300 days.

(21) Appl. No.: 08/838,584

(22) Filed: Apr. 10, 1997

Related U.S. Application Data

(63) Continuation-in-part of application No. 08/539,659, filed on Oct. 5, 1995, now abandoned.

(30) Foreign Application Priority Data

Oct. 6, 1994 (GB) ............................................. 9420185
Oct. 26, 1994 (GB) ............................................. 9421614

(51) Int. Cl.[7] .................................................. C07F 9/02
(52) U.S. Cl. ..................................... 558/71; 252/400.4
(58) Field of Search ........................ 252/400.21; 558/71

(56) References Cited

U.S. PATENT DOCUMENTS

| 4,569,736 A | 2/1986 | Kosegaki et al. ........... 523/105 |
| 4,590,231 A | 5/1986 | Seltzer et al. ............... 524/100 |
| 4,857,230 A | 8/1989 | Matsumura ............ 252/400.24 |
| 5,158,992 A | 10/1992 | Caselli et al. ............... 523/207 |
| 5,298,541 A | 3/1994 | Bohshar et al. ............. 524/126 |
| 5,534,645 A | 7/1996 | Quotschalla et al. .......... 558/71 |
| 5,703,149 A | 12/1997 | Rotzinger et al. .......... 524/116 |

FOREIGN PATENT DOCUMENTS

| EP | 184191 | 6/1986 | |
| EP | 212559 | 3/1987 | |
| EP | 213484 | 3/1987 | |
| EP | 0276913 | 8/1988 | ........... C08K/13/02 |
| EP | 359276 | 3/1990 | |
| EP | 468923 | 1/1992 | |
| EP | 551062 A | 7/1993 | ........... C08L/23/16 |
| EP | 553498 | 8/1993 | |
| EP | 690094 A | 1/1996 | ........... C08K/13/02 |
| GB | 2261667 | 5/1993 | ............ C08K/5/51 |
| GB | 2265377 | 9/1993 | |
| WO | WO 9519391 | 7/1995 | ........... C08L/23/04 |

OTHER PUBLICATIONS

Abstract of Japanese Kokai 57034155 (Feb. 24, 1982) Derwent Publications Ltd.; Section Ch, Week 8214.
Chemical Abstracts abstract of above Japanese Kokai 57034155 (Feb. 24, 1982).

*Primary Examiner*—Joseph K. McKane
*Assistant Examiner*—Kamal Saeed
(74) *Attorney, Agent, or Firm*—Thomas C. Doyle; Scott E. Hanf

(57) ABSTRACT

The invention relates to a stabilizer composition comprising at least one processing stabilizer selected from special phosphite, mono- and diphosphonite compounds, at least one acid scavenger selected from the group consisting of selected metal stearates, hydrotalcites, oxides, hydroxides of alkaline earth metals, at least one UV stabilizer selected from compounds containing at least one 2,2,6,6-tetraalkylpiperidinyl-group and optionally at least one sterically hindered phenolic antioxidant. A further subject matter of the invention is a solid masterbatch composition or a liquid concentrate comprising above-mentioned stabilizer composition. The invention relates also to a process for stabilizing polymeric materials selected from the group consisting of special polyolefins comprising adding to the polymeric material a stabilizing quantity of said stabilizing composition. The invention comprises also a stabilized polymeric material comprising said stabilizing composition and the above-mentioned polymeric material.

20 Claims, No Drawings

STABILIZER COMPOSITION

This is a continuation-in-part of application Ser. No. 08/539,659, filed Oct. 5, 1995 now abandoned.

This invention relates to a stabilizer composition comprising at least one processing stabilizer selected from special phosphite and mono- and diphosphonite compounds, at least one acid scavenger selected from the group consisting of selected metal stearates, hydrotalcites, oxides and hydroxides of alkaline earth metals, at least one UV stabilizer selected from compounds containing at least one 2,2, 6,6-tetraalkylpiperidinyl group and, optionally, at least one sterically hindered phenolic antioxidant. The invention relates also to a solid masterbatch composition or a liquid concentrate comprising an above-mentioned stabilizer composition. The invention further relates to a process for stabilizing polymeric materials selected from the group consisting of special polyolefins comprising adding to the polymeric material a stabilizing quantity of said stabilizing composition. The invention also relates to stabilized polymeric material comprising said stabilizer composition and the above-mentioned polymeric material.

The rapid progress in the development of polymerization catalysts, especially supported catalysts and metallocenes, for the manufacture of polyolefins has made a variety of polymers available which differ significantly in their properties from the "early generation" plastics. The problem to maintain these superior properties during processing and service life of the plastic articles has been aggravated especially in polyolefins produced by Generation II to V catalyst systems which are not removed from the polymer after finalizing the polymerization reaction. Even though such catalysts can be deactivated by catalyst poisons, such as steam, aliphatic alcohols, ethers or ketones, their residual activity can still remain to a certain extent. They can attack the polymer and cause premature failures during its end-use; and furthermore, such catalyst residues can also affect the additives which are supposed to safeguard the integrity of plastic materials.

It is well known that several cations with a positive charge $\geq 2$, especially transition metal ions of the 3d, 4d, and 5d series—typical catalysts for olefin polymerization—, can catalyze the decomposition of phosphites and phosphonites, in particular the hydrolysis of such typical processing stabilizers, finally leading to products with acidic properties and also undesired free phenol. These decomposition products as such can, moreover, cause many disadvantageous secondary effects; for example negative interactions with other additives, especially hindered amine UV stabilizers and phenolic antioxidants, eventually disturbing the entire balance of the additive system contained. In consequence thereof, problems can become apparent already during melt processing of the polymer, e.g. in the form of gel particles, various kinds of deposits or black specks, as well as during its service life, e.g. as reduced mechanical properties, surface cracks or premature embrittlement, when the polymer is exposed to daylight or climate influences.

Many of these undesired processes in a polymeric matrix have been found to originate from a certain acidity, originally present or later formed during the lifetime of a polymer. Therefore, sufficient amounts of acid scavengers, such as metal stearates or oxides, are added to overcome the aforementioned problems. One of the most widely used acid scavengers is calcium stearate, typically used in concentrations of 0.03–0.15%.

However, several other undesired processes, which cannot directly be correlated with the formation of acidity, have been observed in a polymeric matrix despite the presence of acid scavengers. Although the details of such reactions or mechanisms are not fully understood, the consequences thereof can become clearly visible. For instance, certain combinations of plastic additives appear to show negative interactions, often expressed as reduced overall performance, compared with the individual effects of the single additives applied alone in the same polymer.

One example of such negative interactions is the simultaneous use of certain processing stabilizers, e.g. SANDOSTAB P-EPQ or IRGAFOS 12, together with sterically hindered amines (HALS) in UV stabilized polyolefins. Both types of additives are commercially, respectively from a technical viewpoint, important products and essential for the use in high performance plastics. The phosphorus compounds are known to exceptionally safeguard the integrity of the polymer during melt processing; HALS compounds are the state-of-the art stabilizers to protect polyolefins against the detrimental influence of UV light. However, these two types of additives are known to interact antagonistically and, therefore, it has been explicitly recommended not to use any combinations thereof (See publication of Dr. W. O. Drake of Ciba-Geigy, Basel in "Plastics News", April 1989, pages 36–45.) In particular, the efficiency of HALS as UV stabilizers is said to be drastically reduced in such cases, limiting the industrial use of such combinations significantly.

It is the objective of the invention to solve the above-mentioned and to provide a high performance stabilizer composition for the stabilization of polyolefins, in particular those which are produced by Generation II to V (or higher) catalyst systems which are not removed from the polymer after the polymerization reaction.

In accordance with the present invention said problem is solved by a stabilizer composition comprising a) at least one processing stabilizer selected from the group consisting of phosphite, monophosphonite and diphosphonite compounds of formula I or II

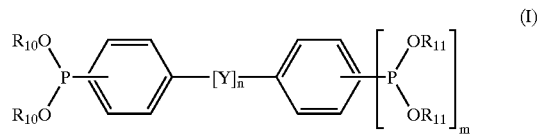

(I)

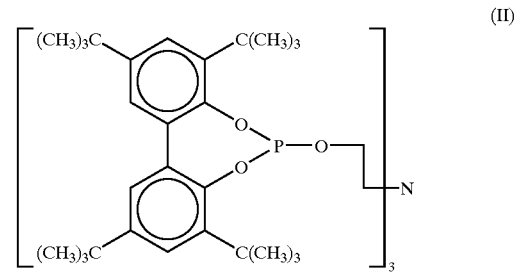

(II)

in which m is 0 or 1;

n is 0 or 1;

each $R_{10}$ and each $R_{11}$, independently, is an aliphatic, alicyclic or aromatic group of 1 to 24 carbon atoms, optionally further substituted (for example by linear or branched aliphatic groups or alkaryl substituents) (hereinafter defined as the monovalent significances of $R_{10}$ or $R_{11}$, respectively);

or both groups $R_{10}$ and/or $R_{11}$ form a cyclic group with a single phosphorus atom (hereinafter defined as the divalent significances of $R_{10}$ or $R_{11}$, respectively); Y is —O—, —S—, —CH($R_{15}$)— or —$C_6H_4$—; where $R_{15}$ is hydrogen or $C_{1-6}$alkyl or COO$R_6$ and $R_6$ is $C_{18}$alkyl, b) at least one acid scavenger selected from the group consisting of sodium stearate, magnesium stearate, zinc stearate; magnesium or magnesium/zinc hydrotalcites, optionally coated with 5 to 50% of metal stearate; zinc oxide, zinc hydroxide, calcium oxide, calcium hydroxide, magnesium oxide and magnesium hydroxide, c) at least one UV stabilizer selected from compounds containing at least one 2,2,6,6-tetraalkylpiperidinyl group and d) optionally at least one sterically hindered phenolic antioxidant selected from the group consisting of octadecyl-3-(3',5'-di-tert.-butyl-4'-hydroxyphenyl) propionate, tetrakis[methylene-3-(3'5'-di-tert.-butyl-4'-hydroxyphenyl)propionate]methane, 1,3,5-trimethyl-2,4,6-tris(3,5-di-tert.-butyl-4-hydroxyphenyl)benzene, 1,3,5-tris(3,5-di-tert.-butyl-4-hydroxyphenyl)-1,3,5-triazine-2,4,6-(1H,3H,5H)trione and tris[3,5-di-tert.-butyl-4-hydroxybenzyl]isocyanurate.

According to the invention, there is provided a synergistic additive package, i.e. a stabilizer composition for polyolefins, in which highly effective processing stabilizers and hindered amine UV stabilizers are combined without sacrificing the individual effects of the additives contained. The selected acid scavengers are able to compensate the negative interactions of processing stabilizers and HALS compounds. In some cases, even superior efficiency of the HALS compounds has been observed, compared with analogous formulations containing such processing stabilizers, which do not show such negative interactions.

Preferably, in component a) the monovalent significances of $R_{10}$ and $R_{11}$ are independently linear, branched or cyclic $C_{1-24}$aliphatic groups; or aromatic groups, e.g. phenyl, preferably substituted 1 to 5-fold with $C_{1-12}$alkyl or aralkyl groups, as for example with $R_{10}=R_{11}=2,4$-di-tert.-butylphenyl.

It will be apparent that when both groups $R_{10}$ and/or both groups $R_{11}$ form a cyclic group with a single phosphorus atom, each such cyclic group comprises the respective moiety —O—P—O— to which both groups $R_{10}$ or both groups $R_{11}$ are attached.

When component a) is at least one compound of formula I, it preferably comprises at least 55%, more preferably at least 70%, by weight, of total compound(s) of formula I.

When component b) is magnesium hydrotalcite or magnesium/zinc hydrotalcite coated with a metal stearate, the amount of metal stearate is preferably 7 to 48%, by weight, based on the weight of the magnesium hydrotalcite or magnesium/zinc hydrotalcite.

The weight ratio of component a) to b) in the stabilizer composition according to the invention is preferably 3:1 to 1:7, more preferably 2:1 to 1:2.

The typical ratios of components a) to d), when the latter is present, are 1:5 to 5:1, preferably in the range of 1:3 to 3:1. The amount of component c), relative to the sum of components a) plus b) plus d), may vary from 1:100 to 100:1, preferably, however, from 1:20 to 20:1.

The synergistic additive package comprising the components a), b), c) and optionally d) is preferably used in the polymers at concentrations of 0.05 to 2%, more preferably 0.1 to 1%, based on the weight of the polymer.

Component a) is preferably a mixture of i) 50–80% of a diphosphonite of formula (x)

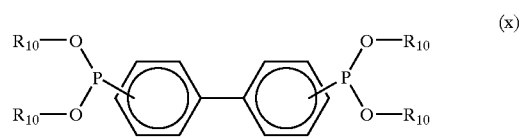

ii) 5–25% of a monophosphonite of formula (y)

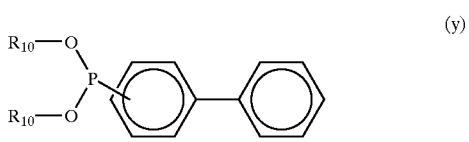

iii) 5–25% of a phosphite of formula (c)

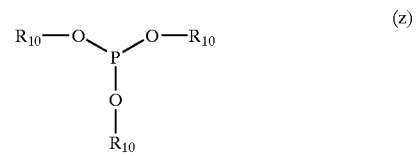

in which each of $R_{10}$ is 2,4-di-tertiary butylphenyl; and where the percentages are weight percentages based on the sum of the compounds of formulae (x), (y) and (z) being 100%.

Preferably, such a mixture of compounds constitutes at least 80%, more preferably at least 85%, most preferably at least 90%, by weight, of component a).

Typically, component i) comprises three isomers of formula (x) in which the phosphorus atoms are attached to the biphenylene moiety at the 4,4'-, 4,3'- and 3,3'-positions, said isomers being present, respectively, in amounts of 36–46%, 17–23% and 2–5%, by weight, respectively, based on the total composition of component a).

More preferably, component a) is the product of condensing 4 mols of 2,4-di-tert.-butylphenol per mol of the product of the Friedel-Crafts reaction of 2 mols of phosphorus trichloride per mol of biphenyl, as described, for instance, in U.S. Pat. No. 4,075,163, the disclosure of which, particularly column 1, line 13 to column 4, line 9 and Example 12, is incorporated herein by reference. More particularly, it is a product composed of i) 60–65 parts of the diphosphonite of formula 1x

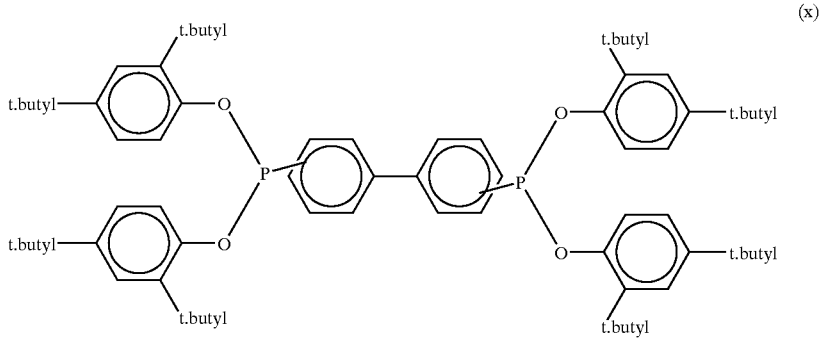

(tetrakis(2,4-di-tert.butylphenyl)biphenylene diphosphonite)

ii) 10–15 parts of the monophosphonite of formula 1(y)

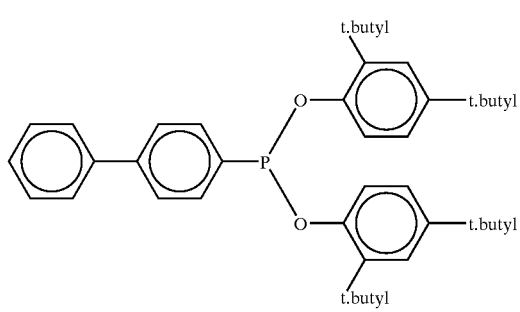

(bis(2,4-di-tert.butylphenyl)biphenylene monophosphonite)

iii) 10–15 parts of the phosphite of formula 1z

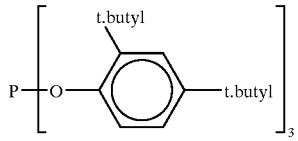

(tris(2,4-di-tert.butylphenyl)phosphite);
iv) up to 3.5 parts of 2,4-di-tert.butylphenol;
v) up to 1% of inorganic chloride;
vi) up to 0.5% of volatile matters; and
vii) up to 5% of the compound of the formula

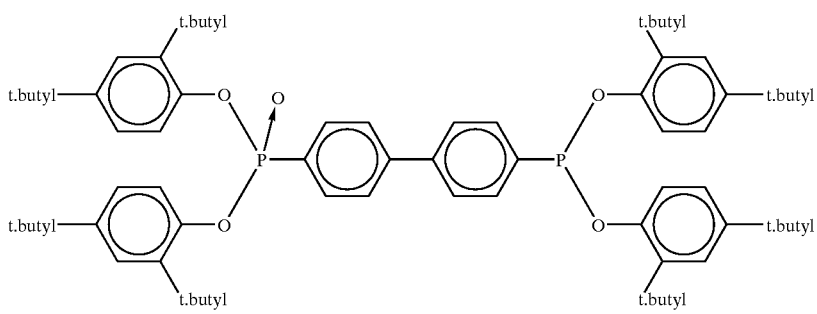

This mixture of components i)–vii) is commercially available as SANDOSTAB P-EPQ from CLARIANT International Ltd., Switzerland.

In the foregoing description of SANDOSTAB P-EPQ parts and percentages are by weight based on 100 parts, by weight, of total components i)–vii).

In component a) the compound of formula II, chemically characterized as 2,2',2"-nitrilo[triethyl-tris(3,3',5,5'-tetra-tert.butyl-1,1'-biphenyl-2,2'-diyl)phosphite], can be applied as obtained by the procedure given in Example 4 of U.S. Pat. No. 4,318,845 or Example 4 of U.S. Pat. No. 4,374,219, with a melting point of 121–134° C., or in its amorphous solid form with a melting range of 105–110° C. according to U.S. Pat. No. 5,276,076, or in its triclinic beta-modification with a melting range of 200–207° C. according to U.S. Pat. No. 5,326,802, or in its gamma-modification with a melting range of 178–185° C. according to U.S. Pat. No. 5,331,031, or in its monoclinic alpha-modification with a melting range of 145–165° C. according to U.S. Pat. No. 5,334,739, in mixtures, melts or in solutions thereof. The disclosures of the aforementioned patents are incorporated herein by reference.

Preferably the divalent significances of $R_{10}$ and $R_{11}$ are. e.g.

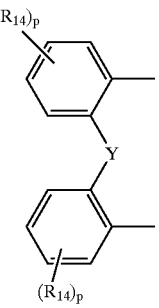

where each $R_{14}$, independently, is selected from $C_{1-22}$alkyl or $C_{7-22}$aralkyl and p=0 to 4, preferably 1 to 3.

The 2,2,6,6-tetraalkylpiperidinyl group of component c) is of formula q or q', preferably formula q

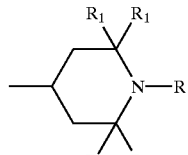

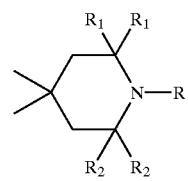

in which

R is hydrogen; oxygen; —OH; $C_{1-24}$alkyl; —O—$C_{1-24}$alkyl; —O—CO—$C_{1-24}$alkyl; —O—CO-phenyl phenyl-O-phenyl or —$COR_5$; where $R_5$ is —$C(R_3)$=$CH_2$, $C_{1-6}$alkyl, phenyl, —CO—$C_{1-24}$alkyl, —CO-phenyl, —$NR_7R_8$, —$CH_2$—$C_6H_5$, —CO—$OC_{1-12}$alkyl, or —COOH; $R_3$ is hydrogen or $C_{1-4}$alkyl; $R_7$ is hydrogen, $C_{1-12}$alkyl, $C_{5-6}$cycloalkyl, phenyl, phenyl-$C_{1-4}$alkyl or $C_{1-12}$alkylphenyl and $R_8$ is $C_{1-12}$alkyl or hydrogen, each $R_1$, independently, is —$CH_3$ or —$CH_2(C_{1-4}$alkyl) or both groups $R_1$ form a group —$(CH_2)_5$— and each $R_2$, independently, is —$CH_3$ or —$CH_2(C_{1-4}$alkyl) or both groups $R_2$ form a group —$(CH_2)_5$—.

Preferably, R is hydrogen; oxygen; —OH; $C_{1-24}$alkyl; —O—$C_{1-24}$alkyl; —O—CO—$C_{1-24}$alkyl; O—CO-phenyl or —$COR_5$.

Such groups of formula q) and q') are known as the effective group in numerous hindered amine light stabilizers (HALS).

More preferably, component c) is a compound containing a group of formula q"

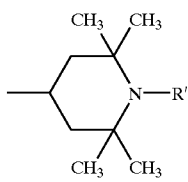

where R' is hydrogen, oxygen, OH, $C_{1-12}$alkyl, —O—$C_{1-12}$alkyl, —CO—$C_{1-8}$alkyl, phenyl or —O-phenyl, preferably hydrogen, oxygen, $C_{1-12}$alkyl, —O—$C_{1-12}$alkyl or —CO—$C_{1-8}$alkyl.

Preferably, component c) is selected from HALS 1 to HALS 18 below

HALS 1

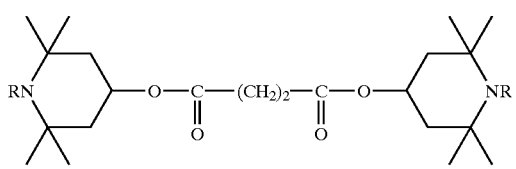

HALS 2

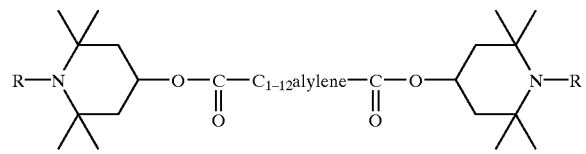

HALS 3

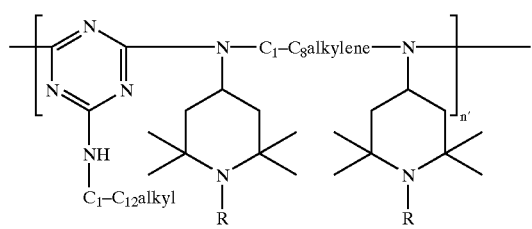

HALS 4

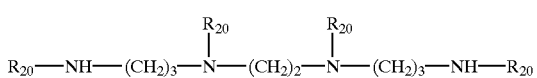

where $R_{20}$ is

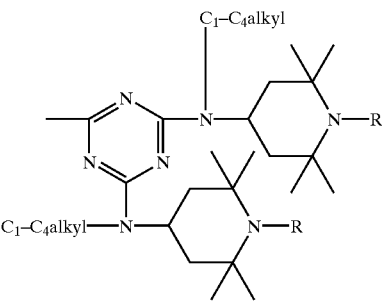

HALS 5

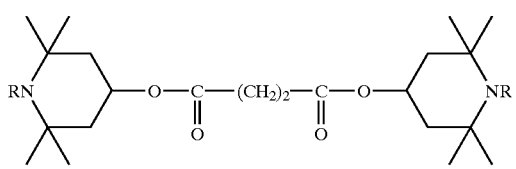

HALS 6

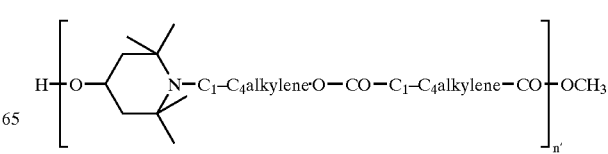

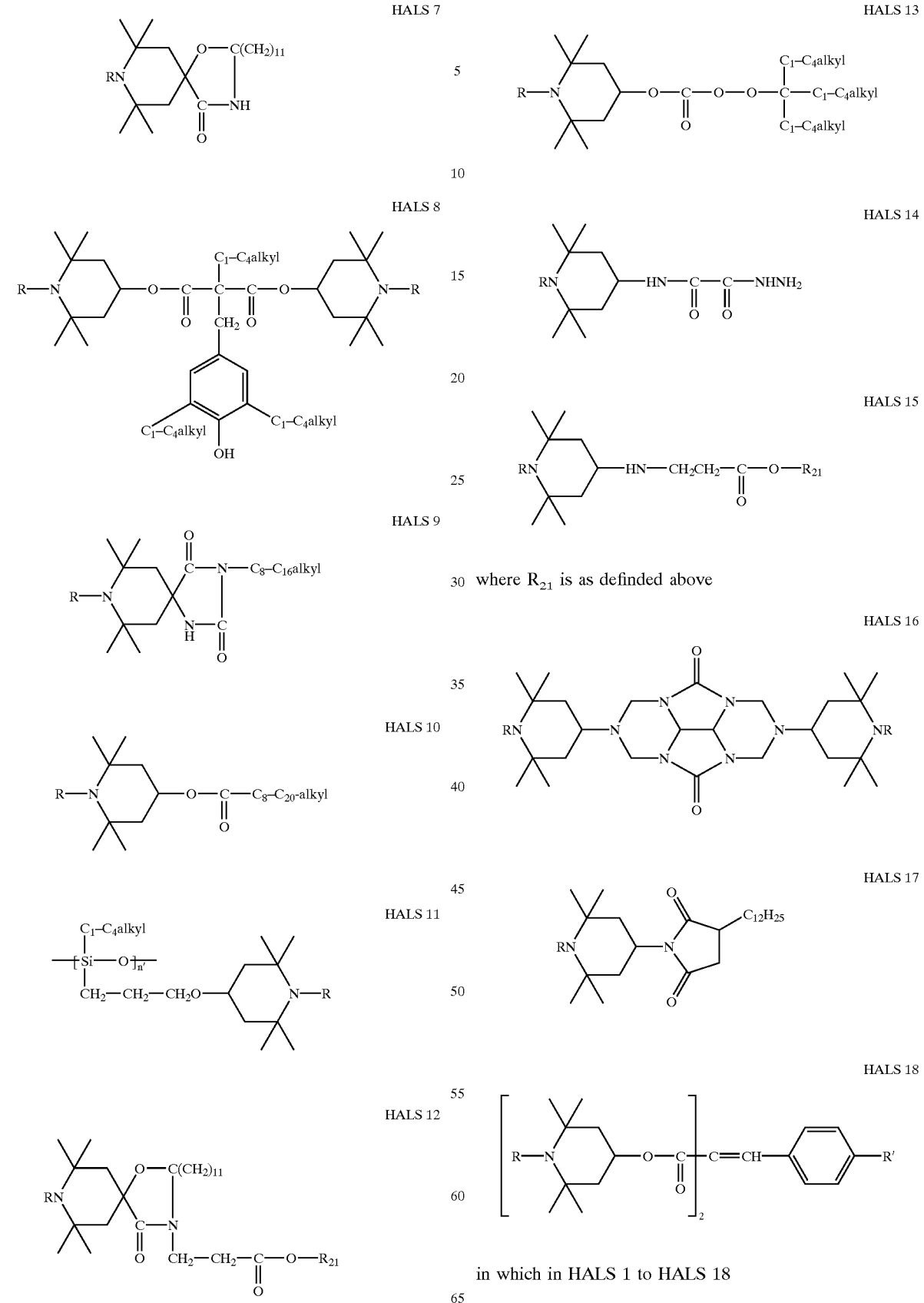
where $R_{21}$ is $C_{12-14}$alkyl (e.g. a mixture of $C_{12}H_{25}$ and $C_{14}H_{29}$);
where $R_{21}$ is as definded above
in which in HALS 1 to HALS 18
R is R' where R' is as defined above and
n' is a number from 3 to 20.

Most preferably, component c) is selected from
Bis(2,2,6,6-tetramethyl-4piperidyl)sebacate;
Bis(1,2,2,6,6-pentamethyl-4piperidinyl)(3,5-ditert.butyl-4-hydroxybenzyl)butylpropane dioate;
Bis(1,2,2,6,6-pentamethyl-4piperidinyl)sebacate;
8-Acetyl-3-dodecyl-7,7,9,9-tetramethyl-1,3,8-triazaspiro(4,5)decane-2,4-dione;
Butanedioic acid, bis(2,2,6,6-tetramethyl-4-piperidinyl) ester;
Tetrakis(2,2,6,6-tetramethyl-4-piperidyl)-1,2,3,4-butane tetracarboxylate;
(2,2,6,6-tetramethyl-4-piperidyl/β,β,β',β'-tetramethyl-3,9-(2,4,8,10-tetraoxaspiro(5',5)undecane)diethyl)-1,2,3,4-butane tetra carboxylate;
7-oxa-3,20-diazadispiro(5.1.11.2)heneicosan-20-propanoic acid, 2,2,4,4-tetramethyl-21-oxo, dodecylester ("Hostavin" N 24);
Octadecene-(N-(2,2,6,6-tetramethylpiperidinyl-4)-N-maleinimido-oxalic acid diamide co-polymer;
N-(2,2,6,6-tetramethyl-4-piperidinyl)-N'-amino-oxamide;
OO-t-amyl-O-(1,2,2,6,6-pentamethyl-4-piperidinyl) monoperoxicarbonate;
β-Alanine-N-(2,2,6,6-tetramethyl-4-piperidinyl)-dodecylester;
Ethanediamide,N-(1-acetyl-2,2,6,6-tetramethylpiperidinyl)-N'-dodecyl;
3-dodecyl-1-(2,2,6,6-tetramethyl-4-piperidinyl)-pyrrolidin-2,5-dione;
3-dodecyl-1-(1,2,2,6,6-pentamethyl-4-piperidinyl)-pyrrolidin-2,5dione;
3-dodecyl-1-(1-acetyl,2,2,6,6-tetramethyl-4-piperidinyl)-pyrrolidin-2,5-dione;
("Sanduvor®" 3058)
4-benzoyloxy-2,2,6,6-tetramethylpiperidine;
1-[2-(3,5-di-tert.butyl-4-hydroxyphenylpropionyloxy) ethyl]-4-(3,5-ditert.butyl-4-hydroxy-phenyl-propionyloxy)-2,2,6,6-tetramethyl piperidine;
2-methyl-2-(2",2",6",6"-tetramethyl-4"-piperidinylamino)-N-(2',2',6',6'-tetra-methyl-4'-piperidinyl)propionylamide;
1,2-bis(3,3,5,5-tetramethyl-2-oxo-piperazinyl)ethane-1-isopropyl-3,3,5,5-tetramethyl-2-piperazinone
Tetrakis(2,2,6,6-tetramethyl-4-piperidyl)1,2,3,4-butane tetracarboxylate; 4-oleoyloxy-2,2,6,6-tetramethylpiperidine;
Poly-[(6-morpholino-s-triazin-2,4diyl)[(2,2,6,6-tetramethyl-4-piperidinyl)imino]-hexamethylene-[(2,2,6,6-tetramethyl-4-piperidinyl)imino)];
Poly-[6-[1,1,3,3-tetramethyl-butyl)imino]-s-triazin-2,4-diyl)[2-(2,2,6,6-tetramethyl-4-piperidinyl)imino] hexamethylene-[4-(2,2,6,6-tetramethyl-4-piperidinyl)imino)];
1,3,5-triazine-2,4,6-triamine-N',N"-[ethanediyl-bis[[[4,6-bis[butyl(1,2,2,6,6-pentamethyl-4-piperidinyl)amine]-1,3,5triazin-2-yl]imino]propane-diyl]]bis[N',N"-dibutyl-N', N"-bis-(1,2,2,6,6-pentamethyl-4-piperidinyl)];
Butanedioic acid, polymer with 4-hydroxy-2,2,6,6-tetramethyl-1-piperidine-ethanol; 2,2,4,4-tetramethyl-7-oxa-3,20-diaza-dispiro[5.1.11.2]heneicosan-21-one;
Bis(1-octyloxy-2,2,6,6-tetramethyl-4-piperidinyl)sebacate;
Poly(methylpropyl-3-oxy-[2,2,6,6-tetramethyl-4-piperidinyl]-siloxane);
1,3,5,7,9,11-hexaaza-4,10-dione-tricyclo[12.1.1.013,14]-tetradecane-1,7-bis(2,2,6,6-tetramethyl-4-piperidinyl).
Especially useful as component c) are
Bis(2,2,6,6-tetramethyl-4-piperidyl)sebacate;
Bis(1,2,2,6,6-pentamethyl-4-piperidinyl)sebacate;
Butanedioic acid, bis(2,2,6,6-tetramethyl-4-piperidinyl) ester;
Poly-[(6-morpholino-s-triazin-2,4-diyl)[(2,2,6,6-tetramethyl-4-piperidinyl)imino]-hexamethylene-[(2,2,6,6-tetramethyl-4-piperidinyl)imino)];
Poly-[6-[1,1,3,3-tetramethyl-butyl)imino]-s-triazin-2,4-diyl)[2-(2,2,6,6-tetramethyl-4-piperidinyl)imino] hexamethylene-[4-(2,2,6,6-tetramethyl-4-piperidinyl) imino)];
1,3,5-triazine-2,4,6-triamine-N',N"-[ethanediyl-bis[[[4,6-bis[butyl(1,2,2,6,6-pentamethyl-4-piperidinyl)amine]-1,3,5-triazin-2-yl]imino]propane-diyl]]bis[N',N"-dibutyl-N',N"-bis-(1,2,2,6,6-pentamethyl-4-piperidinyl)];
Butanedioic acid, polymer with 4-hydroxy-2,2,6,6-tetramethyl-1-piperidine-ethanol;
Bis(1-octyloxy-2,2,6,6-tetramethyl-4-piperidinyl)sebacate;
Poly(methylpropyl-3oxy-[2,2,6,6-tetramethyl-4-piperidinyl]-siloxane)

Further, component c) can optionally be combined with known UV absorbers.

Components a) to c) and optionally d) of the stabilizer composition according to the invention can be added individually to the polymeric materials to be stabilized or can be blended to form an additive package, prior to the addition to the polymeric material. This additive package can be prepared by mixing the components a) to c) and optionally d) in an appropriate mixer to obtain a powder blend which preferably is compacted to non-dusting granules by known methods. Another possibility to prepare such additive packages is to prepare a homogeneous melt of the components a) to c) and optionally d) at elevated temperatures which is then cooled and pelletized by known methods.

Further additives that can be employed along with a stabilizer composition according to the invention include antioxidants as well as UV absorbers (e.g. 2-(2'-hydroxyphenyl)-benztriazoles, 2-hydroxybenzophenones, 1,3-bis-(2'-hydroxybenzoyl)benzene, salicylates, cinnamates and oxalic acid diamides; UV quenchers such as benzoates and substituted benzoates, antistatic agents, flameproofing agents, lubricants, plasticisers, nucleating agents, metal deactivators, biocides, impact modifiers, fillers, pigments and fungicides.

Further according to the invention there is provided a solid masterbatch composition or liquid concentrate for use as a stabilizer in polymeric materials. Said masterbatch composition comprises 10 to 80% by weight, preferably 15 to 40% by weight of a stabilizer composition according to the invention and 90 to 20% by weight, preferably 85 to 60% by weight, of a polymeric material which is identical or compatible with the polymeric material to be stabilized.

The liquid concentrate comprises 10 to 80% by weight of a stabilizer composition according to the invention and 90 to 20% by weight of a solvent. By "solvent" is meant here a liquid in which all or part of the stabilizer composition may be dissolved.

A further subject matter of the invention is a process for stabilizing polymeric materials comprising adding to the polymeric material a stabilizing quantity of the stabilizer composition or of the solid masterbatch or of the liquid concentrate according to the invention. This stabilizing quantity is, as aforementioned, related to the polymeric materials to be stabilized, independent of the selected addition technique.

The stabilizing composition or the masterbatch composition according to the invention may be incorporated by known methods into the polymeric material to be stabilized. Of particular importance is the dry-blending with the polymeric material or coating shaped polymer particles, e.g. polymer spheres, with the present compositions in the form of a liquid, a solution or a suspension/dispersion.

Of particular importance is the blending of the stabilizing composition or the masterbatch composition according to the invention with the polymeric material to be stabilized in the melt, for example in a melt blender or during the formation of shaped articles, including films, tubes, fibers, and foams by extrusion, injection molding, blow molding, spinning or wire coating.

The polymeric material to be stabilized according to the invention is selected from the group consisting of homopolyolefins and copolyolefins produced in the presence of a so called Generation II or higher catalyst (not subjected to a catalyst removal step after the polymerization process), and mixtures and blends thereof with other polymers.

Preferably, the polyolefin is selected from the group consisting of homopolypropylene, copolypropylene, homopolyethylene, copolyethylene and mixtures or blends thereof or with other polymers.

Said poly- and coplyolefins are especially prepared using processing catalysts known as Generation II to Generation V catalysts and which have not been subjected to a catalyst removal step. By the term "catalyst removal step" used herein is meant a step for the purpose of positively removing the catalyst residues contained in the polymerized polyolefins or treating the polyolefins with the compound which can react with the catalyst residue and inactivate or solubilize the residue, such as alcohols or water, and then removing the inactivated or solubilized catalyst residue by physical means such as filtration, washing and centrifuging. The step of adding a small amount of catalyst poisons such as ethers, alcohols, ketones, esters and water to the resulting polymer, to inactivate the catalyst remaining after completion of the polymerization does not fall under the above-mentioned definition of the "catalyst removal step".

What is meant by Generation I catalysts are titanium halide catalysts in combination with an organo aluminum compound, such as an organo aluminum halide.

What is meant by Generation II catalysts are Generation I catalysts supported on an organo magnesium compound or catalysts based on an organo chromium compound, such as dicyclopentadienyl chromium complex, supported on $SiO_2$.

What is meant by Generation III catalyst is a Zeigler type complex catalyst supported on a halogen containing magnesium compound.

What is meant by a Generation IV catalyst is a generation III catalyst with a silane donor.

What is meant by a Generation V catalyst is either a bis-indenyl organo titanium compound supported on alumoxane or a bis cyclopentadienyl titanium halide activated by an aluminum alkyl compound.

Further generations of highly specific catalysts, which are presently under development and which are especially useful for manufacturing highly stereoregular poly-alpha-olefins, belong to the higher generations of supported catalyst systems. Examples for the microstructure of such highly stereoregular polyolefins are syndiotactic polypropylene, isotactic stereoblock polymers, isotactic polypropylene containing steric defects randomly distributed along the polymer chain (so called anisotactic polypropylene) or stereorregular stereoblock polymers. Reviews of the most recent developments in the field of metallocene based catalyst systems are: W. N. Riss and H. Ledwinka: Kunstoffe 83 (1993) 8, pages 577–583; R. Muelhaupt: Nachr. Chem. Tech. Labs 41 (1993) 12, pages 1341–1351; R. Leaversuch: Modem Plastics, October 1991, pages 46–49 and W. Spaleck: Hoechst High Chem Magazine 14 (1993), pages 44–48. Due to the rapid progress in the development of newer generation catalyst systems, the commercial significance of these polymers with novel, highly interesting properties is increasing.

These generations of catalysts are also described in the Twelfth Annual International Conference on Advances in the Stabilization and Controlled Degradation of Polymers held in Luzern, Switzerland, May 21–23, 1990 in an article on pages 181–196 inclusive by Rolf Muelhaupt entitled "New Trends in Polyolefin Catalysts and Influence on Polymer Stability" The contents of this article are incorporated by reference, especially Table I on page 184 describing the Generation of Catalysts.

TABLE I

Polyolefin Catalyst Evolution

| Generation | Example | Cat. Act. (g PP/g Ti h atm) | % Act. Ti | Stereoreg. (% insol in heptane) | Process Technology |
|---|---|---|---|---|---|
| I. | $TiCl_4/AlR_3$ | 40 | 0.01 | 45% | removal of cat. residues and atactic PP |
|  | $TiCl_3/AlEt_2Cl$ | 30 | 0.1 | 92% | removal of catalyst residues |
| II | $Mg(OEt_2)/TiCl_4/AlR_3$ | 40000 |  | 50% | no removal of cat. residues |
|  | $SiO_2/Cp_2Cr$ | 40000 | HDPE |  | (mainly HDPE/LLDPE) |
| III | Mod. $TiCl_3$ cat. | 5000 | 1 | 95% | no purification |
|  | $MgCl_2/TiCl_4/AlR_3$ + ester donor | 20000 | 10 | 92% |  |
| IV | $MgCl_2/TiCl_4/AlR_3$ + silane donor | 40000 | 18 | 99% | no purification no extrusion |
| V | Bis-indenyl-$TiR_2$ on $(AlCH_3O)_x$ | 40000 | 100 | 99% | novel PPs, narrow MWD | in which R is an organo group; HDPE is high density polyethylene, LLDPE is linear low density polyethyene, Cp is cyclopentadienyl, Et is ethyl, PP is polypropylene, MWD is molecular weight distribution and x is an integer above 2(preferably 2–100).

The invention also relates to a stabilized polymeric material comprising a) a stabilizing composition according to the invention and b) a polymeric material selected from the group consisting of homopolyolefins and copolyolefins, preferably selected from the group consisting of homopolypropylene, copolypropylene, homopolyethylene and copolyethylene, produced in the presence of a so called Generation II or higher catalyst and mixtures or blends thereof or with other polymers.

Further, in this specification, where a range is given, the figures defining the range are included therein. Any group capable of being linear or branched is linear or branched unless indicated to the contrary.

For the avoidance of doubt, in the specification t.butyl means tertiary butyl (—C(CH₃)₃).

The invention will now be illustrated by the following Examples in which all parts and percentages are by weight unless indicated to the contrary.

EXAMPLES

All examples are carried out with polymeric materials produced from catalysts of Generation II or higher, not subjected to a catalyst removal step. The preparation of the samples is performed in the following manner: Powdery polymer is dry blended in a mixer with all additives according to the respective compositions. Then, the blend is melt processed on a single screw lab extruder at 210–220° C. to manufacture pelletized polymer with a homogeneous distribution of the additives. These pellets are used to prepare polymer films by compression or blow molding or to manufacture fibers on commercially available processing equipment. The UV stability of the finished plastic is tested with an Atlas Weatherometer WOM 65 WRC (artificial weathering) at 63° C. black panel temperature applying either the CAM 7 exposure of 102 min dry/18 min wetting cycles or just dry exposure without artificial rain during the continuous Xe arc irradiation. For UVA exposure tests, UVCon equipment is used. Depending on the applications, the criteria for failure of the samples are 50% reduction of mechanical properties, e.g. tensile strength or elongation at break, and/or the increase of the Carbonyl Index to a value of 0.3 versus the unexposed reference.

In the examples the following trade names are used.

| | |
|---|---|
| Irganox ® 1010: | this is an antioxidant on the basis of a sterically hindered phenol available from Ciba-Geigy, Switzerland * |
| Sanduvor ® 3944: | this is an oligomeric HALS of high molecular weight, available from CLARIANT International, Switzerland ** |
| Sandostab ® P-EPQ: | a compound consisting of the components (i) to (vii), as described before, available from CLARIANT International, Switzerland *** |
| Irgafos ® 12: | a compound available from Ciba-Geigy which is 2,2',2"-nitrilo[triethyl-tris(3,3',5,5'-tetra-tert. butyl-1,1'-biphenyl-2,2'-diyl)phosphite] |
| Irgafos ® 168: | a compound available from Ciba-Geigy which is tris(2,4-di-tert-butylphenyl)phosphite |
| Irganox ® 3114: | a compound available from Ciba-Geigy which is tris[3.5-di-tert.-butyl-4-hydroxybenzyl]isocyanurate |
| L-55 R: | hydrotalcite, a magnesium aluminium hydroxide carbonate hydrate, coated with 18% sodium stearate, available from Reheis Inc, Berkeley Heights, NJ, USA |
| Hysafe 510: | a magnesium hydrotalcite, available from J. M. Huber Corp., Havre de Grace, MD, USA |
| Ultranox 626: | a commercial phosphite processing stabilizer of G.E. Speciality Chemicals |

*Benzene propanoic acid, 3,5-bis[1,1-dimethylethyl]-4-hydroxy-,2,2-bis[[3-[3,5-bis[1,1-dimethylethyl]-4-hydroxyphenyl]-1-oxopropoxy]methyl]-1,3-propanediyl ester
**Corresponds to the HALS 3 described above in which the alkyl group is $C_8$ alkyl, the alkylene is $C_6$ alkylene and R is hydrogen.
***Product by process: CAS# 119345-01-6

In the Examples the following abbreviations are used:

| | |
|---|---|
| ZnSt₂: | Zinc stearate |
| CaSt₂: | Calcium stearate |
| NaSt: | Sodium stearate |
| I-168: | IRGAFOS 168 |
| I-12: | IRGAFOS 12 |
| P-EPQ: | SANDOSTAB P-EPQ |
| WOM: | Weatherometer |

| | |
|---|---|
| COI: | Carbonyl Index |
| $t_f$: | time to failure (by COI) |
| U-626: | ULTRANOX 626 |
| H-510: | HYSAFE 510 |
| ZnO: | Zinc oxide |
| $t_{50}$: | time to failure by 50% loss of the original tensile strength |

Example 1

| | |
|---|---|
| Specimens: | Films of 100 micron thickness made by compression molding of polypropylene homopolymer having an MFI (231° C., 2.16 kg) of 1.8 g/10 min |
| UV Exposure: | Atlas WOM 65 WRC under CAM 7 conditions |
| Test Criteria: | Time to failure by COI = 0.3 designated as "$t_f$" |
| Formulations: | All samples are base stabilized with 0.05% IRGANOX 1010 and 0.15% SANDUVOR 3944 (HALS compound). They contain further additives as listed below. |

| No. | Further Additives | $t_f$ | Relative |
|---|---|---|---|
| A) | 0.07% I-168 0.10% CaSt₂ | 2210 h | 100% |
| B) | 0.07% P-EPQ 0.10% CaSt₂ | 1825 h | 83% |
| C) | 0.07% I-188 0.10% NaSt | 1920 h | 87% |
| D) | 0.07% P-EPQ 0.10% NaSt | 2520 h | 114% |

The comparisons between formulations A) and B) illustrate the efficiency reducing effect of SANDOSTAB P-EPQ versus IRGAFOS 168 on the UV stabilization of polypropylene, observed for the HALS compound SANDUVOR 3944. This also confirms analogous data of the scientific literature as cited. If the scavenger calcium stearate, as used in formulations A) and B), is replaced with sodium stearate, the new formulationD) was found to surprisingly overcome this disadvantage of the SANDOSTAB P-EPQ combination with the HALS. Even a 14% superior effectiveness of the HALS was found in comparison to the reference formulation A). Comparative example C) shows, furthermore, that the beneficial use of sodium stearate gives unique advantages only with SANDOSTAB P-EPQ and HALS as described, however, not with the IRGAFOS 168 processing stabilizer.

Example 2

The specimens, formulations and test criteria are identical with those given in Example 1. However, the exposure tests were carried out under more severe conditions in an UVCon UVA weathering equipment. This comparison to Example 1 should illustrate that the same rank order of stabilization effects is observed, independent of the test conditions selected.

| No. | Further Additives | $t_f$ | Relative |
|---|---|---|---|
| A) | 0.07% I-168<br>0.10% CaSt$_2$ | 1715 h | 100% |
| B) | 0.07% P-EPO<br>0.10% CaSt$_2$ | 980 h | 57% |
| C) | 0.07% I-168<br>0.10% NaSt | 1390 h | 81% |
| D) | 0.07% P-EPO<br>0.10% NaSt | 1770 h | 103% |

These experimental results confirm the superiority of the unique formulation D) according to the invention over reference formulation A) and underline the data of Example 1. The application of sodium stearate neutralizes selectively the observed negative interaction of SANDOSTAB P-EPQ and HALS Example 3

| Specimens: | Compression molded films of polypropylene homopolymer with a thickness of 100 microns, a typical grade for film and sheet extrusion having a MFI (230° C., 2.16 kg) of 1.8 g/10 min |
|---|---|
| UV Exposure: | Atlas WOM 65 WRC under CAM 7 conditions |
| Test Criteria: | Time to failure by COI = 0.3, designated as "$t_f$" |
| Formulations: | All samples contain 0.05% IRGANOX 1010, 0.10% SANDUVOR 3944 and 0.07% SANDOSTAB P-EPQ plus further additives listed below |

| No. | Further Additives | $t_f$ | Relative |
|---|---|---|---|
| A) | 0.1% CaSt$_2$ | 1233 h | 100% |
| B) | 0.1% NaSt | 1588 h | 126% |
| C) | 0.5% NaSt | 1500 h | 121% |
| D) | 0.0% NaSt | 1067 h | 87% |

The above examples indicate again the benefits of sodium stearate over calcium stearate in formulations comprising Sandostab P-EPQ combinations with HALS compounds. (The presence of the phenolic antioxidant Irganox 1010 is optional and not very significant for the UV stability.) If no stearate is used at all, the efficiency of the formulation D) becomes even inferior to the reference A) in this series. It is obvious from the data given in Examples 1 and 3 that preferred concentrations of the sodium stearate neutralizer are defined by specific ratios of Sandostab P-EPQ/NaSt from 3/1 to 1/7, most preferred in the range 2/1 to 1/2 to provide optimally balances stabilization of the polymer.

Example 4

Specimens: A typical polypropylene reactor grade having a MFI (230° C., 2.16 kg) of 12 g/10 min was used to manufacture 160/14 dtex multifilaments
UV Exposure: Atlas WOM 65 WRC under DRY conditions
Test Criteria: Time to failure by 50% loss of the original tensile strength.
Formulations: A samples are base stabilized with 0.05% Irganox 3114 and 0.20% Sanduvor 3944 plus further additives as listed below

| No. | Further Additives | $t_{50}$ | Relative |
|---|---|---|---|
| A) | 0.08% I-168<br>0.06% CaSt$_2$ | 551 h | 100% |
| B) | 0.08% P-EPQ<br>0.06% CaSt$_2$ | 493 h | 89% |
| C) | 0.08% P-EPQ<br>0.06% L-55R | 733 h | 133% |
| D) | 0.08%P-EPQ<br>0.06% H-510 | 613 h | 111% |
| E) | 0.08% P-EPQ<br>0.06 MgSt$_2$ | 565 h | 106% |

The above examples illustrate that the invention can equally be applied on additive formulations for use in UV stabilized PP fibers. Whereas the presence of CaSt$_2$ is not suitable to neutralize the negative interaction of Sandostab P-EPQ with the HALS (which is never observed in similar formulations containing Irgafos 168 instead; see comparative Example 4A), some other acid scavengers were found to be capable to overcome this antagonism also in this application. In this way it has become possible to utilize the benefits of superior melt and color stability of the polymer by the use of Sandostab P-EPQ, and optionally a phenolic antioxidant, without detracting from the efficient UV stabilization of the polymer achieved by the use of the HALS compound. Among the above formulations C) is certainly the most preferred combination comprising Sandostab P-EPQ and L-55R. Also D) and E) have significance over the comparative samples A) and B). It should also be recognized that the use of the coated version of the hydrotalcite L-55R is preferred over the uncoated form H-510. Both products are again superior to combinations of magnesium stearate with Sandostab P-EPQ, i.e. the preferences in the above formulations can be rank-ordered as E)<D)<C), all clearly exceeding the comparative samples A) and B). Only the commonly used calcium stearate (formulation B) is not applicable. (See also references cited.) It acts just as a usual acid scavenger, but not as an acid scavenger in the sense of a neutralizer for the antagonism of Sandostab P-EPQ and HALS.

Example 5

| Specimens: | A typical LLDPE film grade, a copolymer of ethylene with octene, having a density of 0.920 g/cm$^3$ and an MFI (190° C., 2.16 kg) 1.0 g/10 min |
|---|---|
| UV Exposure: | Atlas WOM 65 WRC under CAM 7 conditions |
| Test Criteria: | Time to failure by 50% loss of the original elongation at break, i.e. of the maximal elasticity of the films |
| Formulations: | All samples contain as base stabilizers for the tests 0.07% IRGANOX 1076 (octadecyl-3,5-bis(1,1-dimethylethyl)-4-hydroxybenzene propanoate) and 0.15% Sanduvor 3944 plus rather additives listed below |

| No. | Further Additives | $t_{50}$ | Relative |
|---|---|---|---|
| A) | 0.10% P-EPQ<br>0.10% CaSt$_2$ | 2567 h | 100% |
| B) | 0.10% P-EPQ<br>0.05% NaSt | 3160 h | 123% |
| C) | 0.10% P-EPQ<br>0.15% NaSt | 3135 h | 122% |

-continued

| No. | Further Additives | $t_{50}$ | Relative |
|---|---|---|---|
| D) | 0.10% P-EPQ<br>0.00% NaSt | 2494 h | 97% |
| E) | 0.10% U-626<br>0.10% NaSt | 2888 h | 113% |

This series of tests shows, moreover, that the present invention is equally valid for polyethylene. It confirms the results described already in Example 3, emphasizing the preferred ratios of Sandostab P-EPQ to sodium stearate of 3/1 to 1/7. most preferred in the range 2/1 to 1/2 when used in fiull additive packages for UV stabilized plastic articles. The Example E) containing Ultranox 626 as comparison to Sandostab P-EPQ is mentioned as one additional reference. This product is known, as is the aforementioned Irgafos 168, not to reduce the effectiveness of HALS UV stabilized plastics. (See EP 553 498 A2 and W. O. Drake, K. D. Cooper "Recent Advances in Processing Stabilization of Polyolefins", especially FIG. 21 therein.) Even such beneficial results can be further exceeded if formulations such as B) and C) are specifically designed as described in the invention.

Example 6

| Specimens: | Films of 100 micron thickness made by compression molding of a high molecular weight type of polypropylene with an MFI (230° C., 5.0 kg) = 0.4 g/10 min |
|---|---|
| UV Exposure: | UVCon UVA weathering equipment |
| Test Criteria: | Time to failure by COI = 0.3, designated as "$t_f$" |
| Formulations: | All samples are base stabilized with 0.05% Irganox 1010 and 0.15% Sanduvor 3944 plus further additives as listed below |

| No. | Further Additives | $t_f$ | Relative |
|---|---|---|---|
| A) | 0.07% P-EPQ<br>0.10% CaSt$_2$ | 805 h | 100% |
| B) | 0.07% I-12<br>0.10% CaSt$_2$ | 807 h | 100% |
| C) | 0.07% I-168<br>0.10% CaSt$_2$ | 1056 h | 130% |
| D) | 0.07% P-EPQ<br>0.10% ZnO | 1098 h | 136% |
| E) | 0.07% I-12<br>0.10% ZnO | 1061 h | 132% |
| F) | 0.07% P-EPQ<br>0.05% ZnSt$_2$<br>0.05% ZnO | 1025 h | 127% |
| G) | 0.07% I-12<br>0.05% ZnSt$_2$<br>0.05% ZnO | 1022 h | 127% |

This series of tests shows that the present invention can be extended also to the use of IRGAFOS 12 in additive formulations for UV stabilized plastics. Despite its excellent hydrolysis resistance, which is even superior to that of IRGAFOS 168 (see lecture of W. O. Drake and K. D. Cooper, both of Ciba-Geigy: "Recent Advances in Processing Stabilization of Polyolefins" presented in Feb. 21–24, 1993, page 419 and FIG. 23), Irgafos 12 exhibits the same negative interaction with HALS compounds as does Sandostab P-EPQ. However, specific combinations with neutralizers of said antagonism allow the use of Irgafos 12 also in UV stabilized plastics, provided that these plastic additives are formulated according to the invention.

The inventive formulations containing Sandostab P-EPQ and Irgafos 12, respectively, in combination with further additives enable already the producer of the polymer, the compounder or the manufacturer of finished plastic articles to take advantage of both the unique effectiveness of high performance processing stabilizers and the unlimited state-of-the-art efficiency of HALS compounds for use in a broad variety of UV-protected polymers.

Furthermore, the testing series of Example 6 indicates by the formulations D) and E) clear advantages for combining Sandostab P-EPQ, respectively Irgafos 12, preferably with ZnO (French process type of zinc oxide supplied by Saint Joseph Company, Monica, Pa., USA, Seido Chem. Ind. Co., Osaka, Japan or others) in UV stabilized polyethylenes. Combinations of ZnO with ZnSt$_2$ (commercially available zinc stearate for polyolefins) and Sandostab P-EPQ, respectively Irgafos 12, as listed in formulations F) and G) show also significant improvements over the corresponding references A) and B), respectively, in UV stabilized polyethylenes, formulated according to the invention.

We claim:
1. A stabilizer composition comprising
   a) a mixture of
      i) 50–80% of a diphosphonite of the formula (x)

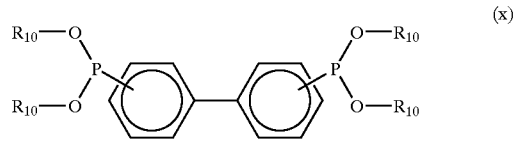

ii) 5–25% of a monophosphonite of the formula (y)

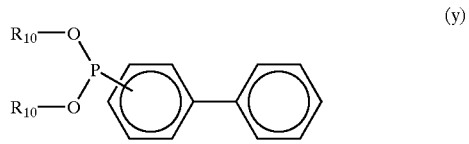

iii) 5–25% of a phosphite of formula (z)

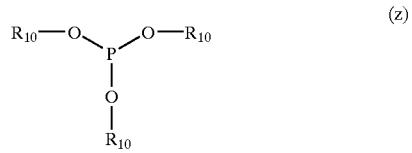

wherein each $R_{10}$ is 2,4-di-tertiary butylphenyl and wherein the percentages are weight percentages based on the sum of the weight percentages of the compounds of formulae (x), (y) and (z) being 100%,
   b) at least one acid scavenger selected from the group consisting of sodium stearate, magnesium stearate, zinc stearate; magnesium or magnesium/zinc hydrotalcites, optionally coated with 5 to 50% of metal stearate; zinc oxide, zinc hydroxide, calcium oxide, calcium hydroxide, magnesium oxide and magnesium hydroxide and
   (c) at least one UV stabilizer selected from compounds containing at least one 2,2,6,6-tetraalkylpiperidinyl group.

2. A composition according to claim 1 in which the weight ratio of component a) to b) is from 3:1 to 1:7.

3. A composition according to claim 1 which further comprises (d) at least one sterically hindered phenolic antioxidant selected from the group consisting of octadecyl-3-(3',5'-di-tert.butyl-4'-hydroxyphenyl)propionate, tetrakis[methylene-3-(3',5'-di-tert.butyl-4'-hydroxyphenyl)propionate]methane, 1,3,5-trimethyl-2,4,6-tris(3,5-di-tert.butyl-4-hydroxyphenyl)benzene, 1,3,5-tris(3,5-di-tert.butyl-4-hydroxyphenyl)-1,3,5-triazine-2,4,6-(1H, 3H, 5H)trione and tris[3,5-di-tert.butyl-4-hydroxybenzyl] isocyanurate.

4. A composition according to claim 1 wherein, in component c), the 2,2,6,6-tetraalkylpiperidinyl group is of the formula q or q'

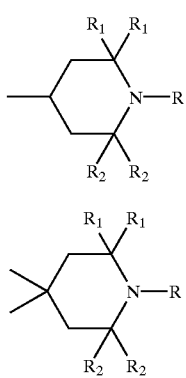

in which

R is hydrogen, oxygen, —OH, $C_{1-24}$alkyl, —O—$C_{1-24}$alkyl, —O—CO—$C_{1-24}$alkyl, —O—CO-phenyl, phenyl, O-phenyl or —COR$_5$, each R$_1$, independently, is —CH$_3$ or —CH$_2$(C$_{1-4}$alkyl) or both groups R$_1$ form a group —(CH$_2$)$_5$—, each R$_2$, independently, is —CH$_3$ or —CH$_2$(C$_{1-4}$alkyl) or both groups R$_2$ form a group —(CH$_2$)$_5$—, R$_3$ is hydrogen or C$_{1-4}$ alkyl, R$_5$ is —C(R$_3$)=CH$_2$, C$_{1-6}$alkyl, phenyl, CO—C$_{1-24}$alkyl, —CO-phenyl, —NR$_7$R$_8$, —CH$_2$—C$_6$H$_5$, —CO—OC$_{1-12}$alkyl or —COOH, R$_7$ is hydrogen, C$_{1-12}$alkyl, C$_{5-6}$cycloalkyl, phenyl, phenyl-C$_{1-4}$alkyl or C$_{1-12}$alkylphenyl and R$_8$ is C$_{1-12}$alkyl or hydrogen.

5. A composition according to claim 4 wherein the 2,2,6,6-tetraalkylpiperidinyl group is a group of formula q.

6. A composition according to claim 3 wherein the weight ratio of component a) to component b) is 2:1 to 1:2, the weight ratio of component a) to component d) is 1:3 to 3:1 and the weight ratio of component c) to the sum of components a) plus b) plus d) is 1:20 to 20:1.

7. A composition according to claim 1 wherein component a) is composed of 60–65 parts of tetrakis(2,4-di-tert.butylphenyl)biphenylene diphosphonite, 10–15 parts of bis(2,4-di-tert.butylphenyl)biphenylene monophosphonite and 10–15 parts of tris(2,4-di-tert.butylphenyl)phosphite.

8. A composition according to claim 4 wherein the weight ratio of component a) to b) is from 3:1 to 1:7.

9. A composition according to claim 1 wherein component c) is a compound of the formula

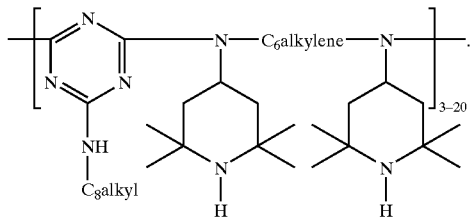

10. A composition according to claim 5 wherein R is hydrogen, oxygen, —OH, C$_{1-24}$alkyl, —O—C$_{1-24}$alkyl, —O—CO—C$_{1-24}$alkyl, —O—CO-phenyl or —COR$_5$.

11. A composition according to claim 10 wherein component c) is a compound containing a group of formula q"

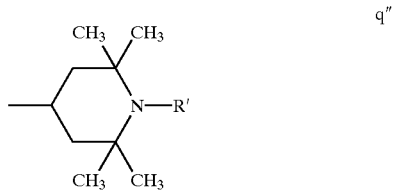

wherein R' is hydrogen, oxygen, —OH, C$_{1-12}$alkyl, —O—C$_{1-12}$alkyl, —CO—C$_{1-8}$alkyl, phenyl or —O-phenyl.

12. A composition according to claim 11 wherein R' is hydrogen, oxygen, C$_{1-12}$alkyl, —O—C$_{1-12}$alkyl or —CO—C$_{1-8}$alkyl.

13. A composition according to claim 4 wherein R is hydrogen, oxygen, —OH, C$_{1-24}$alkyl, —O—C$_{1-24}$alkyl, —O—CO—C$_{1-24}$alkyl, —O—CO-phenyl or —COR$_5$.

14. A composition according to claim 13 which further comprises d) at least one sterically hindered phenolic antioxidant selected from the group consisting of octadecyl-3-(3',5'-di-tert.butyl-4'-hydroxyphenyl)propionate, tetrakis[methylene-3-(3',5'-di-tert.butyl-4'-hydroxyphenyl)propionate]methane, 1,3,5-trimethyl-2,4,6-tris(3,5-di-tert.butyl-4-hydroxyphenyl)benzene, 1,3,5-tris(3,5-di-tert.butyl-4-hydroxyphenyl)-1,3,5-triazine-2,4,6-(1H, 3H, 5H)trione and tris[3,5-di-tert.butyl-4-hydroxybenzyl] isocyanurate.

15. A composition according to claim 13 wherein the weight ratio of component a) to component b) is from 2:1 to 1:2.

16. A composition according to claim 10 which further comprises d) at least one sterically hindered phenolic antioxidant selected from the group consisting of octadecyl-3-(3',5'-di-tert.butyl-4'-hydroxyphenyl)propionate, tetrakis[methylene-3-(3',5'-di-tert.butyl-4'-hydroxyphenyl)propionate]methane, 1,3,5-trimethyl-2,4,6-tris(3,5-di-tert.butyl-4-hydroxyphenyl)benzene, 1,3,5-tris(3,5-di-tert.butyl-4-hydroxyphenyl)-1,3,5-triazine-2,4,6-(1H, 3H, 5H)trione and tris[3,5-di-tert.butyl-4-hydroxybenzyl] isocyanurate.

17. A stabilizer composition comprising
a) a product composed of
   i) 60–65 parts of tetrakis(2,4-di-tert.butylphenyl) biphenylene diphosphonite,
   ii) 10–15 parts of bis(2,4-di-tert.butylphenyl) biphenylene monophosphonite,
   iii) 10–15 parts of tris(2,4-di-tert.butylphenyl) phosphite,
   iv) up to 3.5 parts of 2,4-di-tert.butylphenol,
   v) up to 1% of inorganic chloride,
   vi) up to 0.5% of volatile matters and vii) up to 5% of the compound of the formula

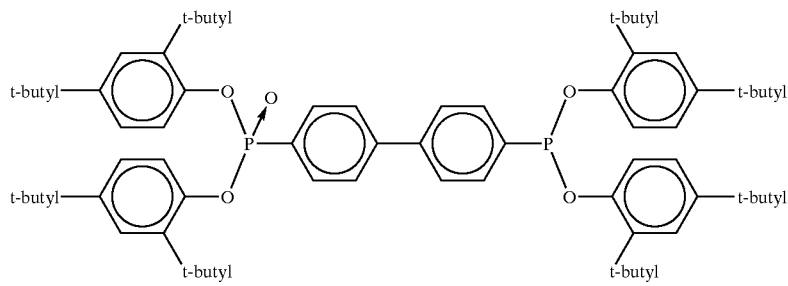

b) at least one acid scavenger selected from the group consisting of sodium stearate, magnesium stearate, zinc stearate; magnesium or magnesium/zinc hydrotalcites, optionally coated with 5 to 50% of metal stearate; zinc oxide, zinc hydroxide, calcium oxide, calcium hydroxide, magnesium oxide and magnesium hydroxide and c) at least one UV stabilizer selected from compounds containing at least one 2,2,6,6-tetraalkylpiperidinyl group.

18. A composition according to claim 17 wherein, in component c), the 2,2,6,6-tetraalkylpiperidinyl group is of the formula q or q'

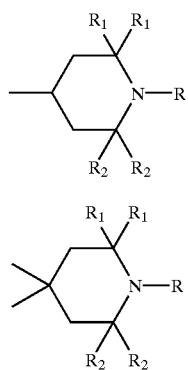

in which

R is hydrogen, oxygen, —OH, $C_{1-24}$alkyl, —O—$C_{1-24}$alkyl, —O—CO—$C_{1-24}$alkyl, —O—CO-phenyl, phenyl, O-phenyl or —$COR_5$, each $R_1$, independently, is —$CH_3$ or —$CH_2(C_{1-4}$alkyl) or both groups $R_1$ form a group —$(CH_2)_5$—, each $R_2$, independently, is —$CH_3$ or —$CH_2(C_{1-4}$alkyl) or both groups $R_2$ form a group —$(CH_2)_5$—, $R_3$ is hydrogen or $C_{1-4}$ alkyl, $R_5$ is —$C(R_3)$=$CH_2$, $C_{1-6}$alkyl, phenyl, CO—$C_{1-24}$alkyl, —CO-phenyl, —$NR_7R_8$, —$CH_2$—$C_6H_5$, —CO—$OC_{1-12}$alkyl or —COOH, $R_7$ is hydrogen, $C_{1-12}$alkyl, $C_{5-6}$cycloalkyl, phenyl, phenyl-$C_{1-4}$alkyl or $C_{1-12}$alkylphenyl and $R_8$ is $C_{1-12}$alkyl or hydrogen.

19. A composition according to claim 18 wherein the 2,2,6,6-tetraalkylpiperidinyl group is a group of formula q.

20. A composition according to claim 19 wherein R is hydrogen, oxygen, —OH, $C_{1-24}$alkyl, —O—$C_{1-24}$alkyl, —O—CO—$C_{1-24}$alkyl, —O—CO-phenyl or —$COR_5$.

* * * * *